Oct. 9, 1923.

L. C. HARRINGTON

BRACKET

Filed April 18, 1922

1,470,261

Inventor
Lorretta C. Harrington

By
Attorney

Patented Oct. 9, 1923.

1,470,261

UNITED STATES PATENT OFFICE.

LORRETTA C. HARRINGTON, OF ST. PAUL, MINNESOTA.

BRACKET.

Application filed April 18, 1922. Serial No. 554,426.

*To all whom it may concern:*

Be it known that I, LORRETTA C. HARRINGTON, a citizen of the United States, residing at St. Paul, in the county of Ramsey and State of Minnesota, have invented certain new and useful Improvements in Brackets, of which the following is a specification.

This invention relates to improvements in brackets and more particularly to a bracket including a fastener over which a clothes line, or the like, is freely moved, and improved means to clamp or fasten the line without necessitating tying or the employment of additional or independent securing means.

The main object of the invention is to provide a bracket of the above character especially designed for use in connection with a clothes line that may be fastened to a supporting structure, quickly and easily and which includes a pulley like arrangement over which clothes lines may be freely moved for shortening or lengthening the same, the pulley like structure being provided with radial ribs arranged in suitable spaced relation whereby the clothes line may be secured against further movement over the pulley like structure by a simple manipulation of the free end of the line.

A further object of the invention is to provide a pulley like fastener over which a line or rope may be freely fed and whose supposed inner faces are provided with radial ribs whereby binding or clamping action can be obtained when the line or rope is forced between certain of the opposed ribs.

A still further object of the invention is to provide a device of the above character that is simple in construction, strong and durable and which it is believed may be manufactured at a low cost.

Various other objects and advantages of my invention will become apparent during the continuance of the following description.

In the drawings:—

Figure 1:
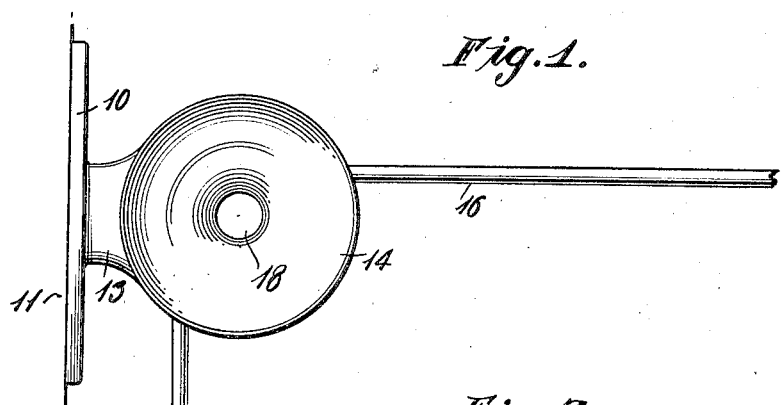
Figure 1 is a view in side elevation showing my invention as in its preferred embodiment.

In describing my invention more in detail 10 designates the body of the bracket which may be secured to a suitable supporting structure 11 by fastening means 12. However, it is to be understood that this form of locking the bracket is shown simply for purposes of illustration and that any other type of supporting means may be employed if it is so desired.

A shank 13 projects from the body member 10 and is formed integral with one side portion of the fastener member 14. The fastener member is of the usual contour, being circular when viewed in side elevation as in Figure 1 and having a V-shaped cut-out about its circumference as indicated at 15. Inasmuch as only one of the side members of the fastener member is attached to the shank 13 it will be observed that the rope or other element 16 used in connection therewith may be freely moved into or out of the cutaway portion 15 between the body member 10 and the free side member.

Figure 3:
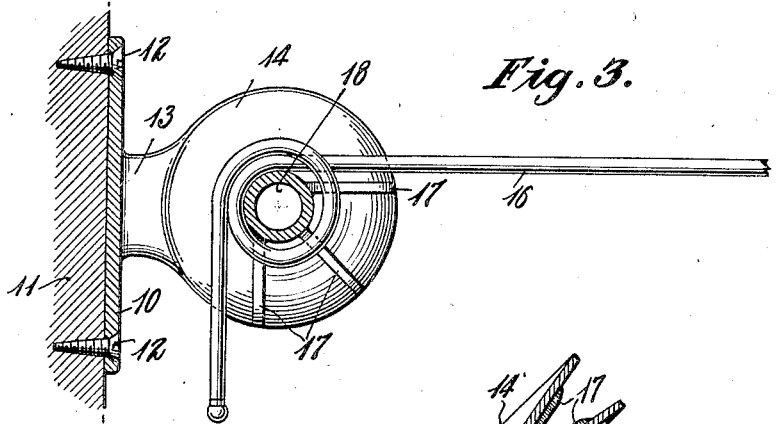
Figure 3 is a view in longitudinal cross-section taken through the body of the device, the line or rope being shown in elevation.

When in use the bracket is preferably mounted as shown in Figure 3. The inclined faces of the side members of the fastener member forming the cut-out 16 are provided with radial ribs 17 that are arranged on the lower half of the fastener member and the outer half thereof with respect to the body member 10. By reason of this arrangement of the ribs 17 it will be observed that the line or rope 16 can normally slide freely over the core 18 of the fastener and that its normal operation will not be in any way affected by the ribs 17. However, when it is desired to lock or clamp the line or rope 16 into position the free end of the line or rope is simply given an extra turn around the core 18 of the fastener member. By then pulling downwardly on the free end of the rope or line a locking or gripping action is obtained between the opposed ribs 17 that will secure the rope or line in place.

Figure 2:
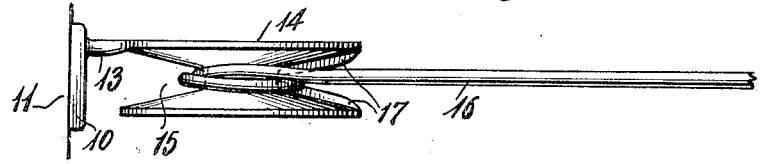
Figure 2 is a view in top plan.

It will be observed that inasmuch as the walls of the cutaway portion 15 of the fastener incline inwardly toward a common point the ribs also present a wedge shaped opening when viewed as in Figure 2 and serve as an efficient clamping means when the rope or line is forced between the ribs as above described. When it is desired to release the line or rope the free end is simply manipulated to remove the extra turn about the core 18 and when that is done the line or rope will be free to move on the core as is obvious.

Upon reference to Figures 1, 2 and 3 it will be noticed that the body member 10, the shank 13 and the fastener member 14 are formed integral with each other which may be accomplished by casting or in any other suitable or desirable way. This construction makes for cheapness of manufacture and at the same time durability in use, and the presentation of a new and compact article.

Figure 4:
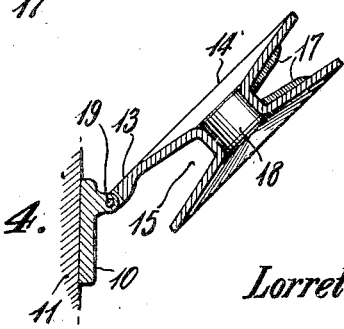
Figure 4 is a view in horizontal cross-section showing my invention in a slightly modified form.

In Figure 4 it will be noticed that the shank 13 is pivotally connected to the body member 10 as at 19 so that the fastener member 14 can be moved in a horizontal plane at different angles with respect to the body member. This particularly is efficient in operation and it is pointed out that it may be used when occasion requires.

From the foregoing it is believed that the advantages and novel features of my invention will be readily understood and therefore further detailed description is deemed unnecessary.

What is claimed is:—

A bracket comprising a fastener member including a body portion, a central core, said body portion being provided with a circumferential cutaway portion leading to said core, whereby a rope may be passed upwardly over and outwardly with respect to said core and have free movement thereon and means within said cutaway portion confined below the plane of the uppermost part of said core and in front of the plane or the rearwardmost part thereof, whereby a rope encircling said core will be gripped and held against retrograde movement, substantially described.

In testimony whereof I affix my signature.

LORRETTA C. HARRINGTON.